United States Patent [19]
Florence et al.

[11] Patent Number: 5,712,902
[45] Date of Patent: Jan. 27, 1998

[54] TELECOMMUNICATIONS ANSWERING FEATURE METHOD AND APPARATUS

[75] Inventors: Lloyd Malcolm Florence, Scarborough; Paul Michael Brennan, Toronto, both of Canada

[73] Assignee: Northern Telecom Limited, Montreal, Canada

[21] Appl. No.: 993,284

[22] Filed: Dec. 18, 1992

[51] Int. Cl.$^6$ .................................................. H04M 3/58
[52] U.S. Cl. .......................... 379/89; 379/202; 379/211; 379/213; 379/376
[58] Field of Search ............................ 379/213, 67, 88, 379/89, 84, 265, 266, 211, 201, 376, 202; 370/110.1

[56] References Cited

U.S. PATENT DOCUMENTS

| | | | |
|---|---|---|---|
| 4,723,273 | 2/1988 | Diesel et al. | 379/211 |
| 4,873,719 | 10/1989 | Reese | 379/201 |
| 5,166,974 | 11/1992 | Morganstein et al. | 379/213 |
| 5,181,236 | 1/1993 | LaVallee et al. | 379/266 |
| 5,243,642 | 9/1993 | Wise, Jr. et al. | 379/376 |

OTHER PUBLICATIONS

ALLTEL Supply Message Monitor Model 400mm Brochure Jul. 12, 1991.

*Primary Examiner*—Ahmad F. Matar
*Attorney, Agent, or Firm*—Foley & Lardner

[57] ABSTRACT

In a telephone system, if the telephone set of a called party is busy or an incoming call is not answered, the called party is unavailable. In this event an incoming call may progress to become intercepted at an attendant position or at a voice features server. A call take back feature permits the called party to be aware of an intercepted call progress so that the called party may retrieve the incoming call by going OFF HOOK and conversing directly with the calling party. A call screening feature is also available. The call screening feature permits the called party to hear the calling party's voice during an intercepted call progress via an audible link provided by the telephone system from the intercepted call. The called party may, at his discretion, retrieve the incoming call from the intercepted call progress by going OFF HOOK and conversing directly with the calling party.

4 Claims, 5 Drawing Sheets

TELECOMMUNICATIONS ANSWERING FEATURE METHOD AND APPARATUS

The invention is in the field of telephony voice services and more particularly relates to a real time communications feature in an otherwise non real time voice services feature.

BACKGROUND OF THE INVENTION

At one time, automatic telephone exchanges were typically limited to providing "plain ordinary telephone service", sometimes referred to as POTS. With POTS, a telephone user may place or initiate a telephone call by dialling a telephone number which identifies the telephone set of another telephone user with whom communication is desired. The telephone user who initiates the call is referred to as a calling party, and the telephone user for whom the call is intended is referred to as a called party. A telephone call involves various elements of the telephone exchange. These elements operate in concert to provide a communication path for the duration of the communication, be it with the called party or alternately with other means to inform the calling party that communication with the party designated by the dialled telephone number is unavailable. Depending upon prevailing conditions of the moment, each telephone call follows a well known progression of events and is termed a call progress. A call progress is initiated when the telephone user actuates a telephone terminal apparatus. This actuation is usually referred to as going OFF HOOK. This event of going OFF HOOK is usually followed by some action being performed by the user. If the user is the calling party, the user indicates an identity of the called party by pressing or dialling digits associated with the called party's telephone set, that is the called party's telephone number. Such action will usually cause one of three typical call progresses in the telephone system, which are briefly summarized as follows:

1) The called party answers by going OFF HOOK, in response to ringing of the called party's telephone set, whereby the calling party is provided with a real time communication or conversation with the called party;

2) The called party will not answer, as the called party is unresponsive to ringing or the called party is already using his telephone set, in which case the calling party has no recourse but to terminate the progress of the call by going ON HOOK; and 3) The telephone call is connected to a voice service feature or a telephone answering machine associated with the called party, which answers on behalf of the called party. In this case, the calling party is usually urged to leave a message for the called party, whereby the calling party may have a delayed communication transmitted to the called party.

A primary function of the voice services feature and the telephone answering machine is that of providing an opportunity for a calling party to leave a message for subsequent receipt by a called party. The first such message service was provided by a service person or a special operator who arranged to intercept telephone calls on behalf of a subscriber to the service. This personal service is relatively expensive and consequently, it has never became commonplace in the day-to-day activities of most telephone users. However recently, machine implementations of telephone answering and voice messaging services have become relatively inexpensive to use. Telephone answering service is available by means of any of various user purchasable answering machines for use with individual telephone terminal apparatus. Alternately more sophisticated voice messaging services are available by access to a voice services feature associated with a telephone key system or a telephone exchange. Voice services provided in this manner are often referred to as centralized voice feature services. Examples of centralized voice feature services may be provided with telephone equipment identified by the trademarks of Norstar and Meridian, manufactured by Northern Telecom Limited.

In addition to the function of capturing voice messages from calling parties, a secondary function of the answering machine is that of a call screening function. The typical telephone answering machine is connected to the telephone line and is arranged to answer an incoming telephone call after the occurrence of several ringing signals. When the telephone call is answered, the callers voice is usually made audible via a loudspeaker in the answering machine provided for this purpose. In the event that the called party is physically present, but is unable to answer or has chosen not to answer the telephone immediately, the called party's identity and purpose for calling may become audibly apparent to the called party. In this event, the called party may choose to communicate directly with the calling party, in a real time conversation, simply by going OFF HOOK. Some examples of a series of telephone answering machines, manufactured by Northern Telecom Limited, are identified by the trademark Symphony 6000, Symphony 7000 and Symphony 8000.

In contrast, if a called party is a user of a centralized voice services feature, there is no local telephone answering machine and the called party is unable to hear any message being deposited. The centralized voice services feature is not physically associated with the called party's telephone line and hence the called party is not made aware of the calling party, except by subsequent access to the centralized voice services feature. Hence, it is at some later time that the called party may be advised of the call and possibly of the caller's intent.

SUMMARY OF THE INVENTION

It is an object of the invention to provide a call take back feature for a called party, for whom an incoming telephone call has been intercepted by either an attendant or a centralized voice services feature. In accordance with the call take back feature, indication of a call interception event is provided at the called telephone terminal apparatus. The called party is provided with the opportunity of going OFF HOOK to cause the call to be retrieved from the attendant or central voice services feature apparatus and redirected to the called party's telephone apparatus.

It is also an object of the invention to provide a call screening feature for a called party who's telephone set is equipped with a loudspeaker. In accordance with the call screening feature, indication of a call interception event is provided at the called telephone terminal apparatus by audible broadcast of the intercepted call via the loudspeaker. If the called party is within hearing distance, the called party may take the opportunity to retrieve the incoming call by going OFF HOOK and conversing directly with the calling party.

In one example of the invention, if the called party's telephone terminal apparatus is idle, the called party may be provided with a simplex bridge connection whereby any related call which has been intercepted is also audible to the called party's telephone set.

In another example of the invention, if the called party's telephone is already busy with a call, either a visible or an audible indication is provided with each occurrence of an interception event, whereby the called party has the option of either ending or holding the instant call and retrieving the intercepted call.

A telephone system is operable by a control means therein, for providing a call to a telephone set of a called party in response to an incoming call for the called party, and alternately for providing an intercepted call in response to a predetermined state of the telephone set of the called party. The telephone system includes means for causing an indication of an occurrence of the intercepted call to be signalled to the telephone set of the called party, and means for retrieving an intercepted call and replacing it with the call to the telephone set of the called party, in response to an occurrence of an acceptance signal from the telephone set of the called party, whereby the called party is able to take back an intercepted call.

A method of operating a telephone switching facility in accordance with the invention, to provide a call take back feature, comprises the steps of:

a) responding to an incoming telephone call from a calling party by initiating a call toward a telephone set of a called party;

b) in an event of the call having been intercepted, transmitting an indication of the intercepted call to the called party's telephone set; and c) in response to an occurrence of a predetermined signal from the called party's telephone set, prior to a cessation of the intercepted call, altering the call to include the called party.

A method of operating a telephone switching facility in is accordance with the invention, comprises the steps of:

u) causing an indication of a call screening feature at a telephone set, in response to the call screening feature having been invoked at the telephone set;

v) in an event of the telephone set being called while the call screening feature is invoked, intercepting the call at one of an attendant position and a voice features server;

w) if the called telephone set is OFF HOOK, transmitting an intercepted call, to the called telephone set. If the called telephone set is ON HOOK, progress of the call is altered to include a link with the intercepted call, whereby the intercepted call is audible at the called party's telephone set.

BRIEF DESCRIPTION OF THE DRAWINGS

An example of the invention is discussed with reference to the accompanying drawings in which.

DESCRIPTION OF THE EXAMPLE EMBODIMENTS

Figure 1:
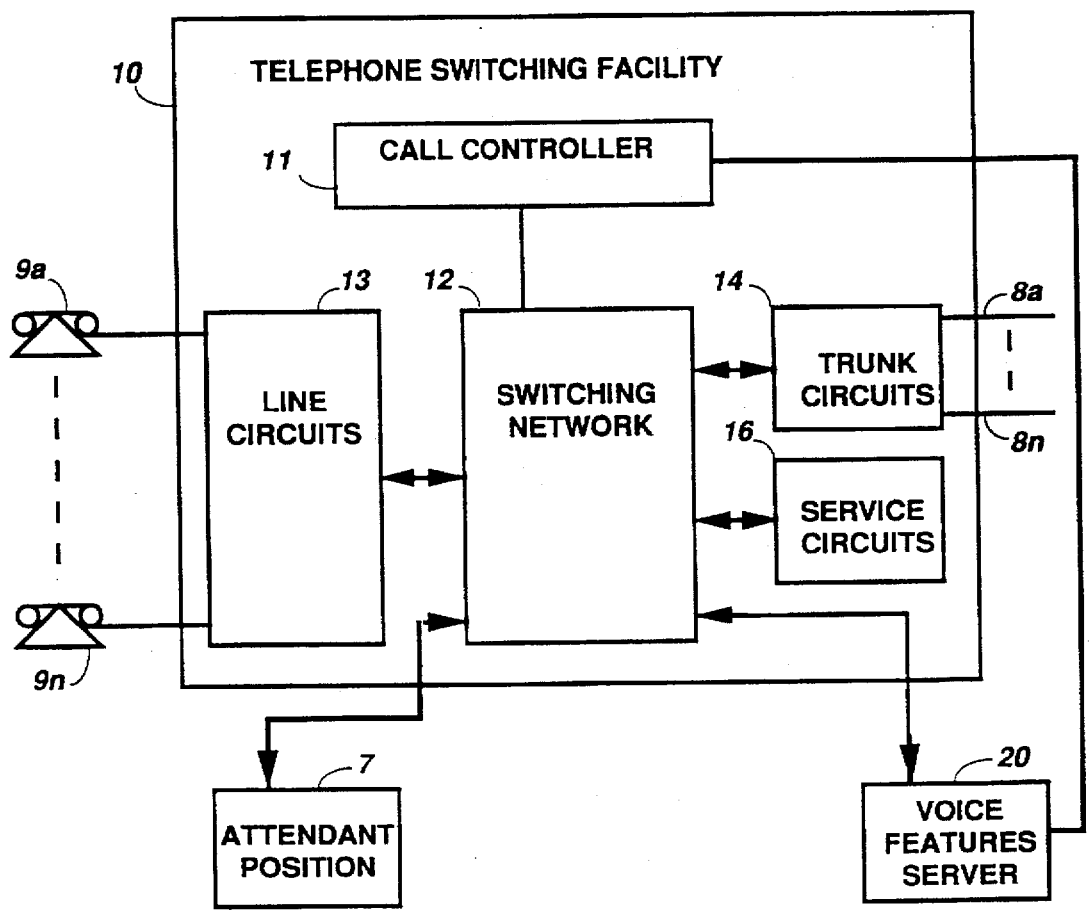
FIG. 1 is a schematic block diagram of telephone equipment, including a telephone switching facility, a voice features server, and an attendant position.

The centrally located telephone equipment illustrated in FIG. 1 includes the telephone switching facility 10, having a switching network 12, line circuits 13 and trunk circuits 14, which are operative as directed by a call controller 11. The call controller 11 is responsive to instruction sets stored therein to provide communication paths between calling and called ones of telephone station sets 9a–9n and between the telephone sets 9a–9n and various of trunks 8a–8n. The telephone stations 9a–9n may each include or be associated with an apparatus having a loudspeaker for audibly producing ringing signals and or reproducing voice band signals received from the telephone line. Telephone apparatus and facilities of this general form and function are well known to persons of typical skill in the art of electronic switched telephony. However for convenience of description, the operation of a typical telephone switching facility is briefly reviewed.

In its operation, the telephone switching facility 10 utilizes various service circuits, not shown, for generating and detecting telephony signalling and supervision signals and interfacing signalling and supervision information with the call controller 11. The progress of s functions involved with setting up, maintaining, and tearing down a telephone call are referred to as a call progress. If these functions result in a calling party being connected with some destination other than that having been identified by the calling party as being a called party the normal progress of these functions is said to have been intercepted, resulting in an intercepted call.

During typical operations of establishing a telephone call, one of the functions in the progress of the telephone call is that of receiving signalling, representative of dialled or pressed digits, from a calling party at one of the telephone sets 9a–9n. When the dialled or pressed digits are representative of a telephone number of a called party, they are referred to as primary signalling. During the initial portion of a telephone call, dial tone is supplied to the calling party to indicate that the telephone switching facility 10 has connected a service circuit, not shown, for receiving and detecting primary signalling. After the telephone switching facility 10 is satisfied that the primary signalling has been received, the service circuit is disconnected, and it is then available for another telephone call.

Dialled or pressed digits which may be originated at a telephone set sometime later, during a conversational portion of the call progress, are usually referred to as secondary signalling. Secondary signalling is relied upon to provide telephone users with access to and control of telephony features such as voice messaging. As a matter of convenience secondary signalling is usually transmitted in the form of dual-tone multifrequency (DTMF) signals. DTMF signals are transmittable by way of voice band communication paths and hence may be responded to by any telephone facility involved with the telephone call.

Secondary signalling may also be communicated in any of various proprietary digital signal formats, as is typical of some digital signal private branch exchanges (PBXs) and digital signal key telephone systems. In any event, if secondary signalling is made of use, provision is made for continuous monitoring of the conversational portion of the call progress to receive and detect any occurrence of secondary signalling. It may be possible to monitor all telephone calls for secondary signalling, however this is at considerable equipment expense. Consequently secondary signalling is not usually provided for unless the telephone user takes some action, such as flashing the telephone switch hook, or unless the telephone call has been routed to or intercepted by a special facility, for example the voice features server 20 as shown in FIG. 1. The voice features server 20, is an apparatus which in this example provides centralized voice mail services for various of the telephones 9a–9n connected with the telephone switching facility. One example of apparatus which is used as a voice features server, is disclosed in U.S. Pat. No. 4,608,685, titled "Packet and Circuit Switched Communications Network" issued to the assignee, Northern Telecom Limited, on Aug. 26, 1986.

If a called party is already engaged in telephone conversation or has forwarded his calls to the central voice mail feature, in typical operation, the telephone switching facility 10 intercepts the progress of the call by directing the incoming call to the voice features server 20. The voice features server 20 responds to commands from the call controller 11 by answering the intercepted call on behalf of a called party. Alternately the call controller may have directed the incoming call to the attendant position 7. In either event, the called party cannot be made aware of the occurrence of the intercepted call. If the called party simply fails to answer within a few predetermined rings, the call is likewise answered at the voice features server 20 or at the attendant position 7. In either instance, the called party can be advised as to the subject matter of the call, following the normal completion of the progress of the intercepted call, by later calling the voice mail feature or by later communication with the attendant.

In the example embodiment, the stored program instructions include an instruction set which activates the call take back feature and the call screening feature, as appropriate. The call take back feature and the call screening feature are discussed with reference to FIGS. 2 and 3, respectively.

Figure 2:
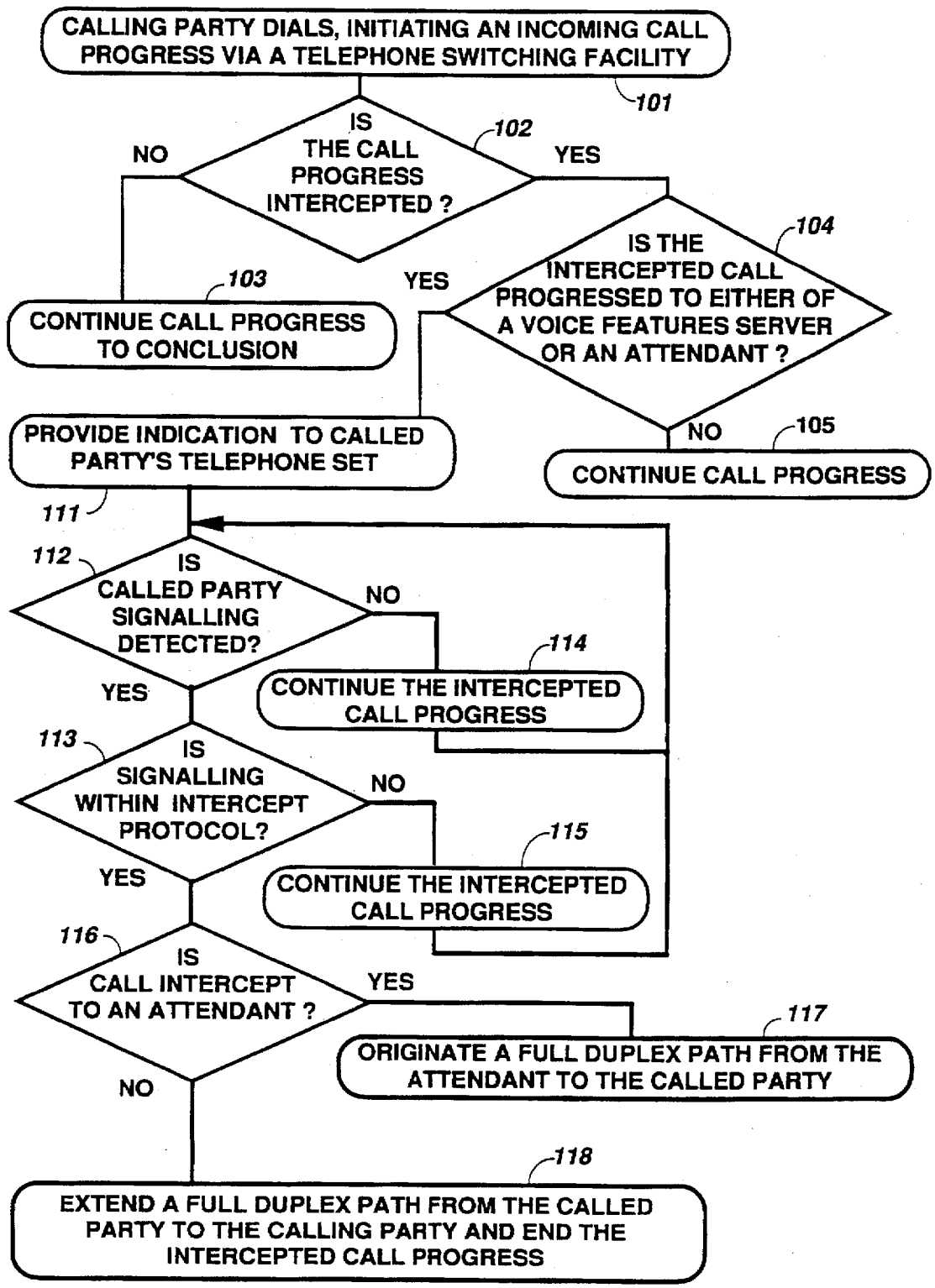
FIG. 2 is a flow chart diagram illustrative of a method of operation of the telephone equipment illustrated in FIG. 1, for taking back an intercepted call in accordance with the invention.

In FIG. 2, the flow chart illustrates a method of operating the telephone system in FIG. 1 to provide the call take back feature. In the flow chart, function box 101 indicates that the call take back feature is preceded by a calling party having dialled the telephone number of the called party, thereby initiating an incoming call progress via the telephone switching facility. As indicated in a decision box 102, if the progress of the call is not intercepted, the progress of the call continues to a normal conclusion at a function box 103. However, the call may be intercepted for various reasons. For example, if the called party is availed of the central is answering feature, the call will be intercepted if the called parry fails to answer after several rings or if the called party is already OFF HOOK. The intercepted call is tested, as shown in a decision box 104, to determine if the intercepted call is in progress to either of a voice services feature or an attendant position. If not, the intercepted call continues to a typical conclusion as indicated in a function box 105. If yes, as shown in a function box 111, an indication is provided to the called party's telephone set. This indication is in the form of a signal appropriate for generating a response at the telephone set to which the signal is directed. The indication is transmitted from the telephone switching facility. The telephone set may react by producing a visual indication such as a flashing light or a display, or an audio indication, being audible via a loudspeaker, not shown, or via the hand set of the telephone set. As shown in a decision box 112, the called party's telephone line is monitored by the switching facility 10 to detect any signalling from the called party, while the intercepted call continues with either of the voice features server 20 or the attendant position 7. If called parry signalling is not detected, the intercepted call continues as indicated in a function box 114. If called party signalling is detected, the signalling is tested, as indicated in a decision box 113, to determine if the signalling indicates that the called party desires to take the call back from its connection with either of the voice features server 20 or the attendant position 7. If the detected signalling does not so indicate, the intercepted call continues as indicated in function box 115. If the detected signalling so indicates, then specifics of the intercepted call are determined to be one of two possible call take back procedures, as indicated in a decision box 116.

In this example, if the call has been answered via the attendant position 7, a full duplex path is originated by the switching facility 10, from the attendant position to the called party's set, as indicated in a function box 117. This permits the called party to converse with the attendant while the attendant remains the intercept party, having full control over the incoming call. If the called party so desires, the attendant initiates a call transfer of the intercepted call to the called party, thereby effectively giving the call back to the called party. Alternatively if the call has been answered by the voice features server 20, a full duplex path is extended by the switching facility 10 from the calling party to the called party's set, while the call to the voice features server 20 is abruptly ended, as indicated in a function box 118.

Figure 3:
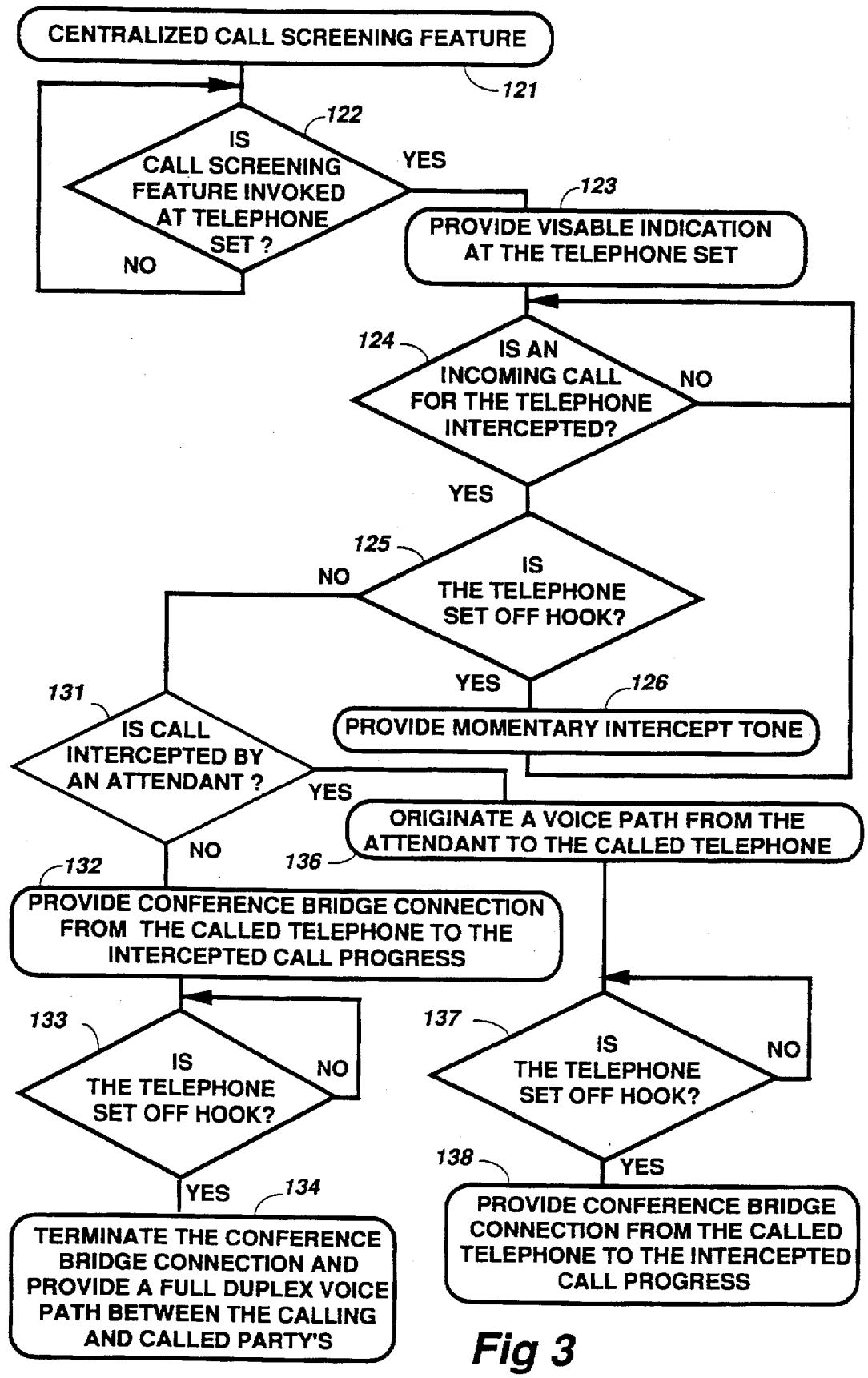
FIG. 3 is a flow chart diagram illustrative of a method of operation of the telephone equipment illustrated in FIG. 1, for screening or monitoring any intercepted call, with an option of either taking back any intercepted call or not in accordance with the invention.

In FIG. 3, the flow chart illustrates a method of operating the telephone system in FIG. 1 to provide a call screening feature for a telephone user having a telephone set equipped with a loudspeaker, not shown. In the flow chart, the centralized call screening feature 121 may be either invoked or disabled at any time by the telephone user by actuation of an appropriate key or dialling of the appropriate code at the user's telephone set. In this example, for convenience of description, it is assumed that the telephone equipment of FIG. 1 is able to support a telephone set having keys with visibly displayable key status. In operation, a telephone for which the call screening feature is available, is monitored from time to time by the telephone system to determine any change of state. If the call screening feature is determined to have been invoked, as determined in a decision box 122, a visible indication is displayed at the telephone set, as indicated in a function box 123. If an incoming call for the telephone set is intercepted at the attendant position 7, or by the voice features server 20, and the telephone set is OFF HOOK, as determined at decision boxes 124 and 125, a momentary intercept audible tone is supplied to the telephone user. Some visible indication may also be supplied. If the incoming call is intercepted, as just described, and the telephone set is eventually placed ON HOOK or was ON HOOK, then it is determined as to which of two possible destinations the call has been routed to, as indicated in a decision box 131.

If the call has not been routed to the attendant position 7, it has been intercepted by the voice features server 20. In this case, as indicated in a function box 132, a conference bridge connection is provided with the intercepted call so that any verbal response to the answering service is broadcast via the loudspeaker in the called party's telephone set. While the broadcast is in progress, if the OFF HOOK state is detected as indicated in a function box 133, the conference bridge is replaced by a full duplex voice path connection between the calling and called parties as indicated in a function box 134. Otherwise the call intercept by the voice features server continues to its conclusion.

If the call has been intercepted at the attendant position 7 as determined in the decision box 131, a voice path is originated from the attendant position 7 to the called telephone set, as indicated in a function box 136, so that any conversation between the attendant and the calling party is broadcast via the loudspeaker. If the OFF HOOK state is detected, at a decision box 137, a conference bridge connection is provided from the called telephone to the intercepted call, as indicated in a function box 138. A distinctive audible tone or visual indication may be provided at the attendant position to alert the attendant to the fact that the called party is now available. As the conference bridge is effectively originated by the called party the attendant may withdraw from the call without interrupting the connection now established between the calling and called parties. Hence in accordance with this method of operation, the call screening feature is available for calls intercepted by a voice mail service and for calls intercepted by an attendant.

Figure 4:
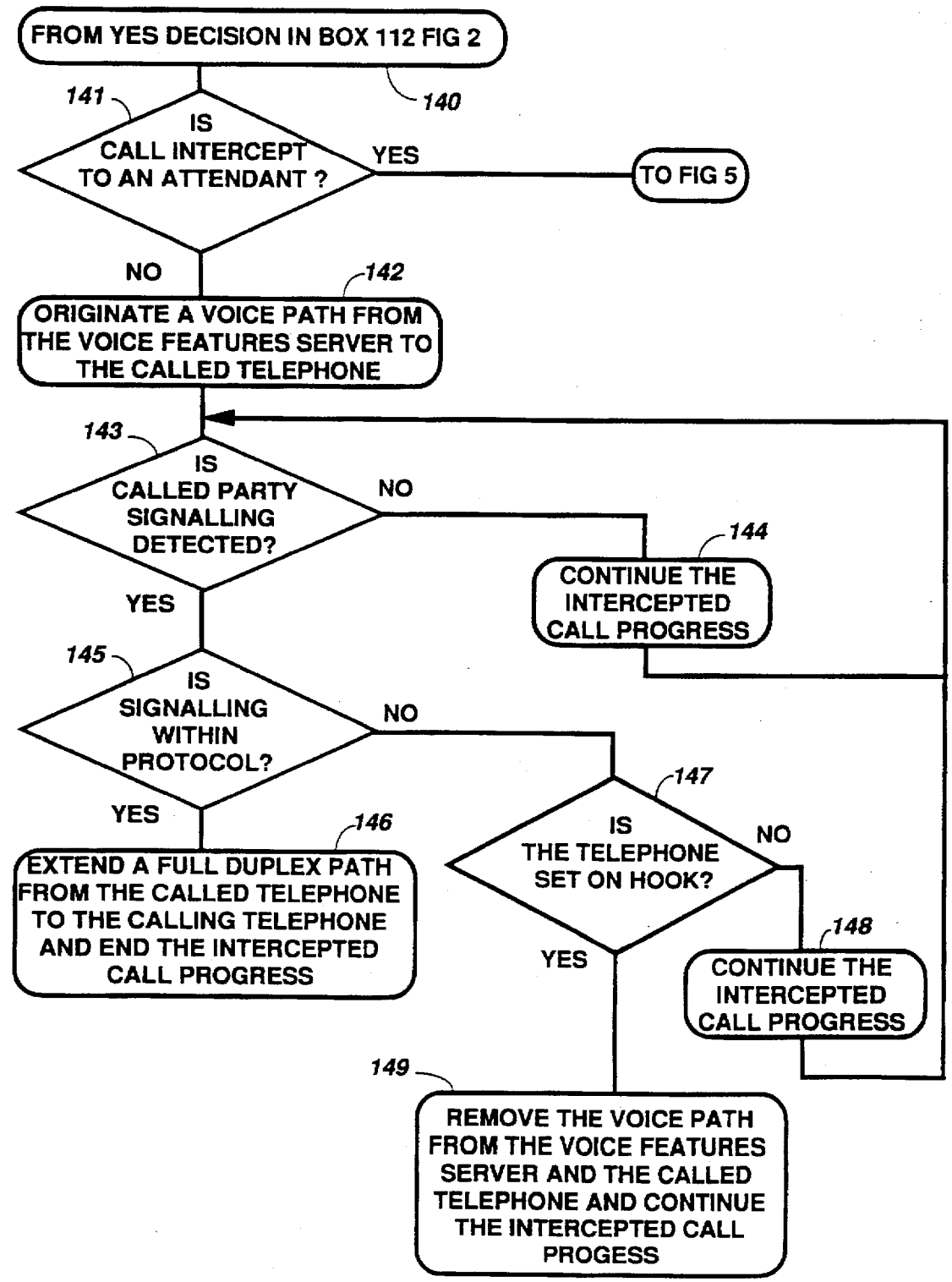
FIGS. 4 and 5 are flow chart diagrams which are illustrative of another method of operation of the telephone equipment illustrated in FIG. 1, for selectively invoking call screening of an intercepted call and subsequently providing the option of either taking back the call, or not, in accordance with the invention.

In an alternate example embodiment, the stored program instructions include an instruction set which permits a user to choose to invoke a call screening feature, only after having received an indication of an intercepted call progress, and thereafter permits the user to take the call back from the intercepting apparatus. This alternate example embodiment is discussed with reference to FIGS. 4 and 5, wherein FIG. 4 pertains to a call progress intercepted at the voice features server 20, and FIG. 5 pertains to a call progress intercepted at the attendant position 7. The steps illustrated in FIG. 4 are subsequent to the called party having received an indication of a call having been intercepted at either of the attendant position 7 or the voice features server 20, as indicated in a box 140 in FIG. 4. Called party signalling, having been detected in the decision box 112 in FIG. 2, is taken as an indication that the called party wishes to invoke the call screening feature so that the called party may be made aware of the calling party's is identity or intent. If the call is intercepted at the voice features server 7, as indicated in a decision box 141, a voice path is originated from the voice features server 7 to the called party so that the caller's voice is audible at the called party's telephone set. The called party can monitor the intercepted call via the telephone hand set if the telephone set is not equipped with a loudspeaker. After listening to the calling party's voice for a moment, the called party may dial a digit or digits to indicate a desire to take the call back. If signalling from the called party is detected, as shown in a decision box 143, the signalling is tested to determine if it is a request for call take back, as shown at a decision s box 145. As long as no signalling is detected, the call intercept continues as indicated in a function box 144. However if signalling from the called party requests call take back, a full duplex path is extended from the called party to the calling party and the call intercept progress is ended, as indicated in a function box 146. On the other hand, if the detected signalling was not within the expected protocol but the called party's telephone set is OFF HOOK, as determined in a decision box 147, the voice path established as shown at the function box 142 is maintained. The call intercept progress continues and the called parties telephone set continues to be monitored for secondary signalling. Alternately, if the telephone set is ON HOOK when the tested signalling is found to be outside the expected protocol, the call screening voice path having been established as indicated in the function box 142 is removed as indicated at a function box 149, and the intercepted call progresses to a normal conclusion.

Figure 5:
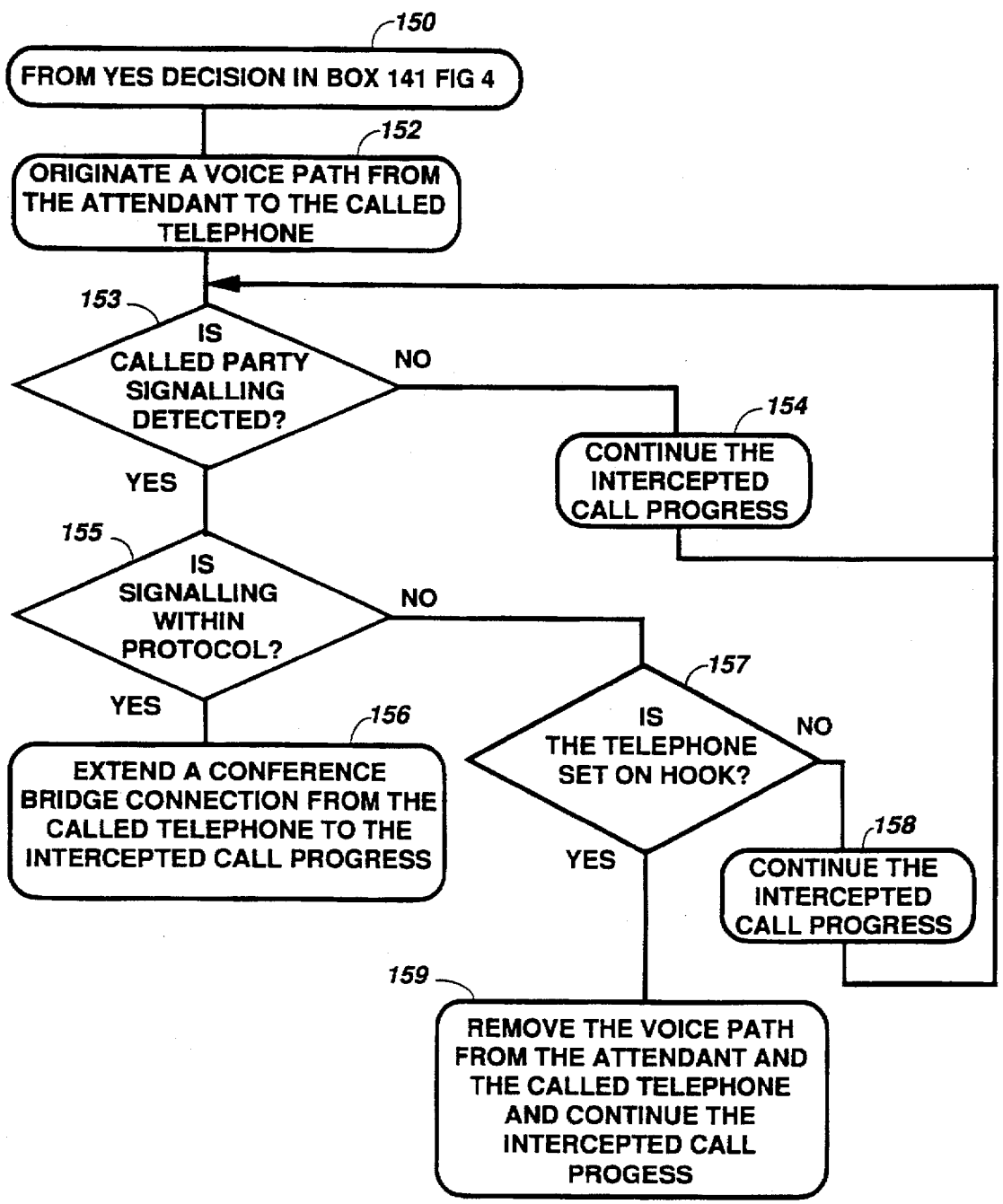

In FIG. 5, a box 150 indicates that the call has been intercepted at the attendant position 7 and, as required in a function box 152, a voice path is originated from the attendant position 7 to the telephone set of the called party, so that the caller's voice and the attendant's voice are both audible at the called party's telephone set. If signalling from the called party is detected, as shown in a decision box 153, the signalling is tested to determine if it is a request for call take back, as shown at a decision box 155. As long as no signalling is detected, the call intercept continues as indicated in a function box 154. However if signalling from the called party requests that the call be retrieved, a call take back signal may be provided at the attendant's position 7, and, as indicated in a function box 156, a conference bridge is extended from the called party to the intercepted call. The call take back signal is intended to provide the attendant with the opportunity to effect a smooth and orderly verbal handoff to the called party and thereafter exit from the call at the attendant's convenience. On the other hand, if the detected signalling was not within the expected protocol but the called party's telephone set is OFF HOOK, as determined in a decision box 157, the voice path established at function box 152 is maintained. The call intercept progress continues and the called party's telephone set continues to be monitored for secondary signalling. Alternately, if the telephone set is ON HOOK when the tested signalling is found to be outside the expected protocol, the call screening voice path having been established via the function box 152 is removed as indicated at a function box 159. In this event the intercepted call progresses to a normal conclusion.

In the foregoing, the invention has been discussed within the environment of a telephone system with centralized call control, for example a private branch exchange or a central office. However it will be apparent to persons of typical skill that the principles of the invention may also be embodied in various telecommunications systems. For example the features hereinbefore disclosed may also be provided in a digital key telephone system.

We claim:

1. A method of operating a telephone switching facility wherein the switching facility performs the steps of:
   a) transmitting a signal for causing an indication of a call screening feature at a telephone set, in response to the call screening feature having been invoked at the telephone set;
   b) in an event of the telephone set being called while the call screening feature is invoked, intercepting the call and connecting the call to one of an attendant position and a voice features server;
   c) if the called telephone set is OFF HOOK, transmitting a signal for indicating an occurrence of an intercepted call, to the called telephone set; where following step b), if the called telephone set is ON HOOK or becomes ON HOOK during the progress of the intercepted call, in step c) the switching facility routes the intercepted call to include a communications link linking the intercepted call to the called party's telephone set, whereby the intercepted call is audible at the called party's telephone set.

2. A method of operating a telephone switching facility as defined in claim 1 wherein the call having been intercepted at the attendant position, responsive to a predetermined signal from the called party's telephone set, providing a conference connection to the called party's telephone set from the intercepted call.

3. A method of operating a telephone switching facility as defined in claim 1 wherein the call having been intercepted at the voice features server, responsive to a predetermined signal from the called party's telephone set, ending the progress of the intercepted call and establishing the call with the called party via a full duplex communications path.

4. A method of operating a telephone switching facility, for providing a call feature, comprising the steps of:
   a) responsive to the progress of a call toward a telephone set of a called party having been intercepted at one of an attendant position and a voice features server, providing an indication at the called party's telephone set;

b) in the event of the progress of the call having been intercepted at the voice features server, and in response to an occurrence of a predetermined call screening signal from the called party's telephone set,
  i) originating a communication path from the voice features server to the called party's telephone set,
  ii) transmitting voice band communications signals originating at the calling party's telephone set to the called party's telephone set from the voice features server and continuing the progress of the intercepted call,
  iii) in response to an occurrence of a signal from the called party's telephone set, prior to a cessation of the progress of the intercepted call, and if said signal corresponds to a predetermined acceptance signal, extending a full duplex communication path from the telephone set of the called party to the telephone set of the calling party, and, if said signal does not correspond to the predetermined acceptance signal and the called party's telephone set is in an OFF HOOK state; continuing with step b) ii); and c) in the event of the progress of the call having been intercepted at the attendant position, and in response to an occurrence of the predetermined call screening signal from the called party's telephone set,
  i) originating a communication path from the attendant position to the called party's telephone set,
  ii) transmitting voice band communications signals originating at the calling party's telephone set and at the attendant position to the called party's telephone set from the attendant position and continuing the intercepted call,
  iii) in response to an occurrence of a signal from the called party's telephone set, prior to a cessation of the progress of the intercepted call, and if said signal corresponds to a predetermined acceptance signal, extending a conference bridge from the telephone set of the called party to the attendant position, and, if said signal does not correspond to the predetermined acceptance signal and the called party's telephone is in an OFF HOOK state, continuing with step c) ii).

* * * * *